United States Patent
Venkatanaranappa et al.

(10) Patent No.: US 10,193,878 B2
(45) Date of Patent: Jan. 29, 2019

(54) USING APPLICATION LEVEL AUTHENTICATION FOR NETWORK LOGIN

(71) Applicant: Aruba Networks, Inc., Sunnyvale, CA (US)

(72) Inventors: Venkatraju Tumkur Venkatanaranappa, Bangalore (IN); Rajesh Kumar Ganapathy Achari, Bangalore (IN); Anoop Kumaran Nair, Thrikkakkara (IN); Santhosh Cheeniyil, Saratoga, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 390 days.

(21) Appl. No.: 14/068,766

(22) Filed: Oct. 31, 2013

(65) Prior Publication Data

US 2015/0121500 A1    Apr. 30, 2015

(51) Int. Cl.

| G06F 7/04 | (2006.01) |
|---|---|
| G06F 15/16 | (2006.01) |
| G06F 17/30 | (2006.01) |
| H04L 29/06 | (2006.01) |

(52) U.S. Cl.
CPC ................. H04L 63/0815 (2013.01)

(58) Field of Classification Search
CPC .... H04L 9/321; H04L 9/3213; H04L 63/0815
USPC ............. 726/2–9, 11–12, 16–21, 26–30
See application file for complete search history.

(56) References Cited

U.S. PATENT DOCUMENTS

| 7,565,356 | B1* | 7/2009 | Xu et al. | |
|---|---|---|---|---|
| 2005/0198501 | A1* | 9/2005 | Andreev | H04L 63/0815 713/168 |
| 2006/0274695 | A1* | 12/2006 | Krishnamurthi et al. | .... 370/331 |
| 2011/0035794 | A1* | 2/2011 | Wang | G06Q 20/042 726/9 |
| 2011/0185403 | A1* | 7/2011 | Dolan | G06F 21/31 726/6 |
| 2011/0314532 | A1* | 12/2011 | Austin et al. | ...... 726/8 |
| 2012/0110651 | A1* | 5/2012 | Van Biljon | G06Q 30/04 726/4 |
| 2013/0247142 | A1* | 9/2013 | Nishizawa | G06F 21/604 726/1 |

* cited by examiner

*Primary Examiner* — Trong H Nguyen
(74) *Attorney, Agent, or Firm* — Hewlett Packard Enterprise Development LP

(57) ABSTRACT

In general, in one aspect, embodiments relate to receiving, by a system comprising one or more network devices, a first client authentication information comprising a first indication that a first client device was successfully authenticated by a first authentication server based on credentials provided by the first client device, and forwarding, by the system, the first client authentication information to a second authentication server without determining that the client device was already successfully authenticated by the first authentication server based on the credentials provided by the first client device. The operations further include receiving, by the system from the second authentication server, a second indication that the first client device was successfully authenticated, and based on the second indication received by the system from the second authentication server, granting, by the system, network access to the first client device.

20 Claims, 13 Drawing Sheets

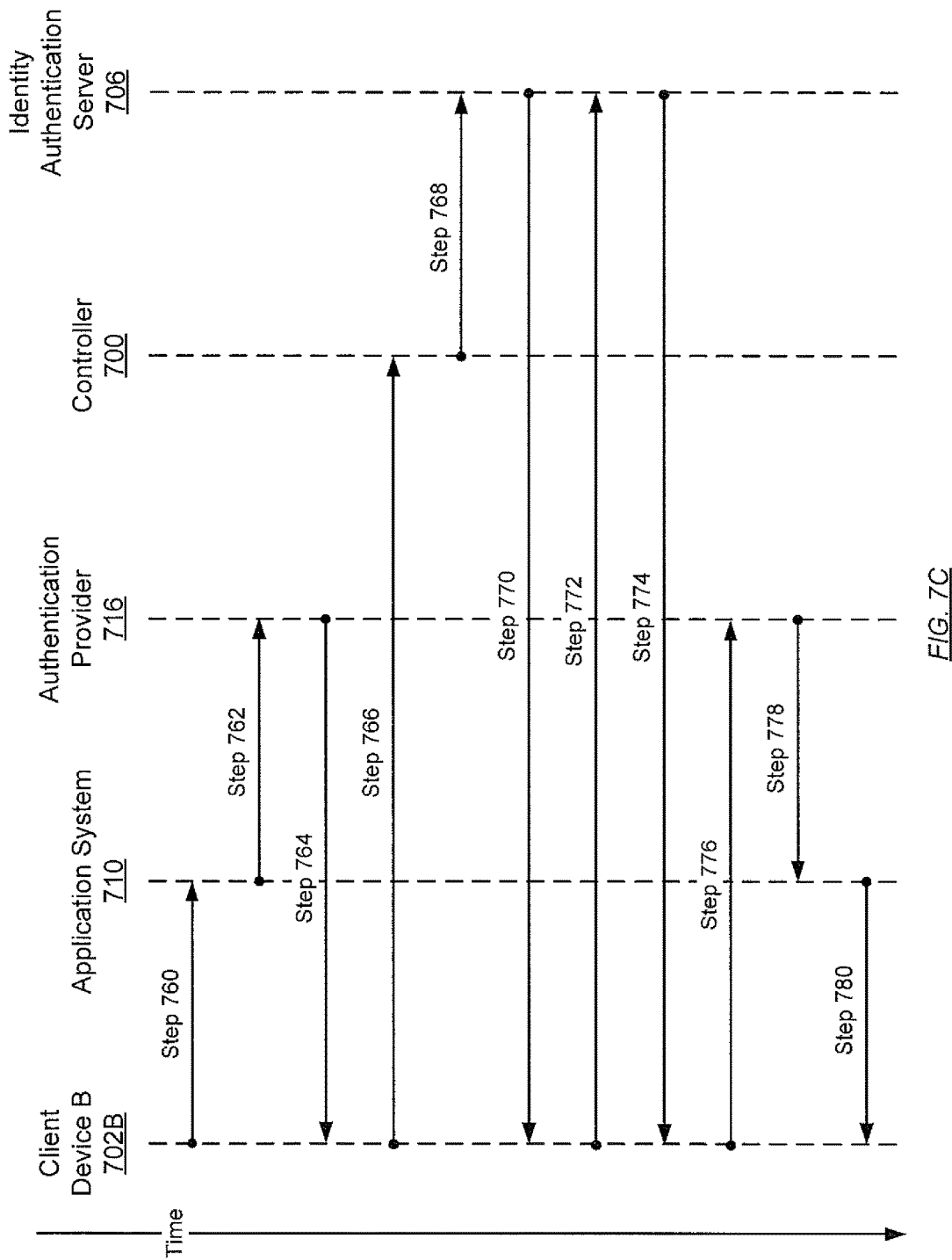

ers, causes performance of operations. The operations include receiving, by a system comprising one or more network devices, a first client authentication information comprising a first indication that a first client device was successfully authenticated by a first authentication server based on credentials provided by the first client device, and forwarding, by the system, the first client authentication information to a second authentication server without determining that the client device was already successfully authenticated by the first authentication server based on the credentials provided by the first client device. The operations further include receiving, by the system from the second authentication server, a second indication that the first client device was successfully authenticated, and based on the second indication received by the system from the second authentication server, granting, by the system, network access to the first client device.

USING APPLICATION LEVEL AUTHENTICATION FOR NETWORK LOGIN

BACKGROUND

Modern networks and web-based applications frequently require user authentication before access may be granted. Often, each network or web application implements its own authentication scheme, frequently using a username and password combination. The result is that users are charged with remembering or securely storing a large number of credentials to access the systems they use. Single sign on (SSO) protocols provide users the ability to access different web applications using a single set of credentials. SSO protocols also allow web application providers the ability to have users authenticated by external systems.

OVERVIEW

In general, in one aspect, embodiments relate to a non-transitory computer readable medium comprising instructions which, when executed by one or more hardware processors, causes performance of operations. The operations include receiving, by a system comprising one or more network devices, a first client authentication information comprising a first indication that a first client device was successfully authenticated by a first authentication server based on credentials provided by the first client device, and forwarding, by the system, the first client authentication information to a second authentication server without determining that the client device was already successfully authenticated by the first authentication server based on the credentials provided by the first client device. The operations further include receiving, by the system from the second authentication server, a second indication that the first client device was successfully authenticated, and based on the second indication received by the system from the second authentication server, granting, by the system, network access to the first client device.

In general, in one aspect, embodiments relate to a non-transitory computer readable medium comprising instructions which, when executed by one or more hardware processors, causes performance of operations. The operations include subsequent to a first client device being authenticated by a first authentication server, receiving by a second authentication server from a system (a) a request to authenticate the first client device for network access and (b) a first client authentication information comprising a first indication that the first client device has already been authenticated, wherein the system has forwarded the first client authentication information to the second authentication server without determining that the first client device has already been authenticated, and wherein the system comprises one or more network devices, determining, by the second authentication server, that the first client device is authenticated for network access based on the first client authentication information comprising the first indication that the first client device has already been authenticated, and transmitting, by the second authentication server to the system, a second indication that the first client device is authenticated to access the network, wherein the system provides network access to the first client device based on the second indication received from the second authentication server but not based on the first indication received from the first authentication server.

In general, in one aspect, embodiments relate to a system. The system includes at least one network device including a hardware processor configured to perform operations. The operations include receiving a first client authentication information comprising a first indication that a first client device was successfully authenticated by a first authentication server based on credentials provided by the first client device, forwarding the first client authentication information to a second authentication server without determining that the client device were already successfully authenticated by the first authentication server based on the credentials provided by the first client device, receiving, from the second authentication server, a second indication that the first client device was successfully authenticated, and based on the second indication received by the system from the second authentication server, granting network access to the first client device.

In general, in one aspect, embodiments relate to a computer system. The computer system includes a hardware processor and a first authentication server. The first authentication server is configured to perform operations configured to execute on the hardware processor. The operations include subsequent to a first client device being authenticated by a second authentication server, receiving from a system (a) a request to authenticate the first client device for network access and (b) a first client authentication information comprising a first indication that the first client device has already been authenticated, wherein the system has forwarded the first client authentication information to the first authentication server without determining that the first client device has already been authenticated, and wherein the system comprises one or more network devices. The operations further include determining that the first client device is authenticated for network access based on the first client authentication information comprising the first indication that the first client device has already been authenticated, and transmitting, to the system, a second indication that the first client device is authenticated to access the network, wherein the system provides network access to the first client device based on the second indication received from the first authentication server but not based on the first indication received from the second authentication server.

Other aspects will be apparent from the following description and the appended claims.

BRIEF DESCRIPTION OF DRAWINGS

FIGS. 7A-7C show an example in accordance with one or more embodiments.

DETAILED DESCRIPTION

Figure 1:
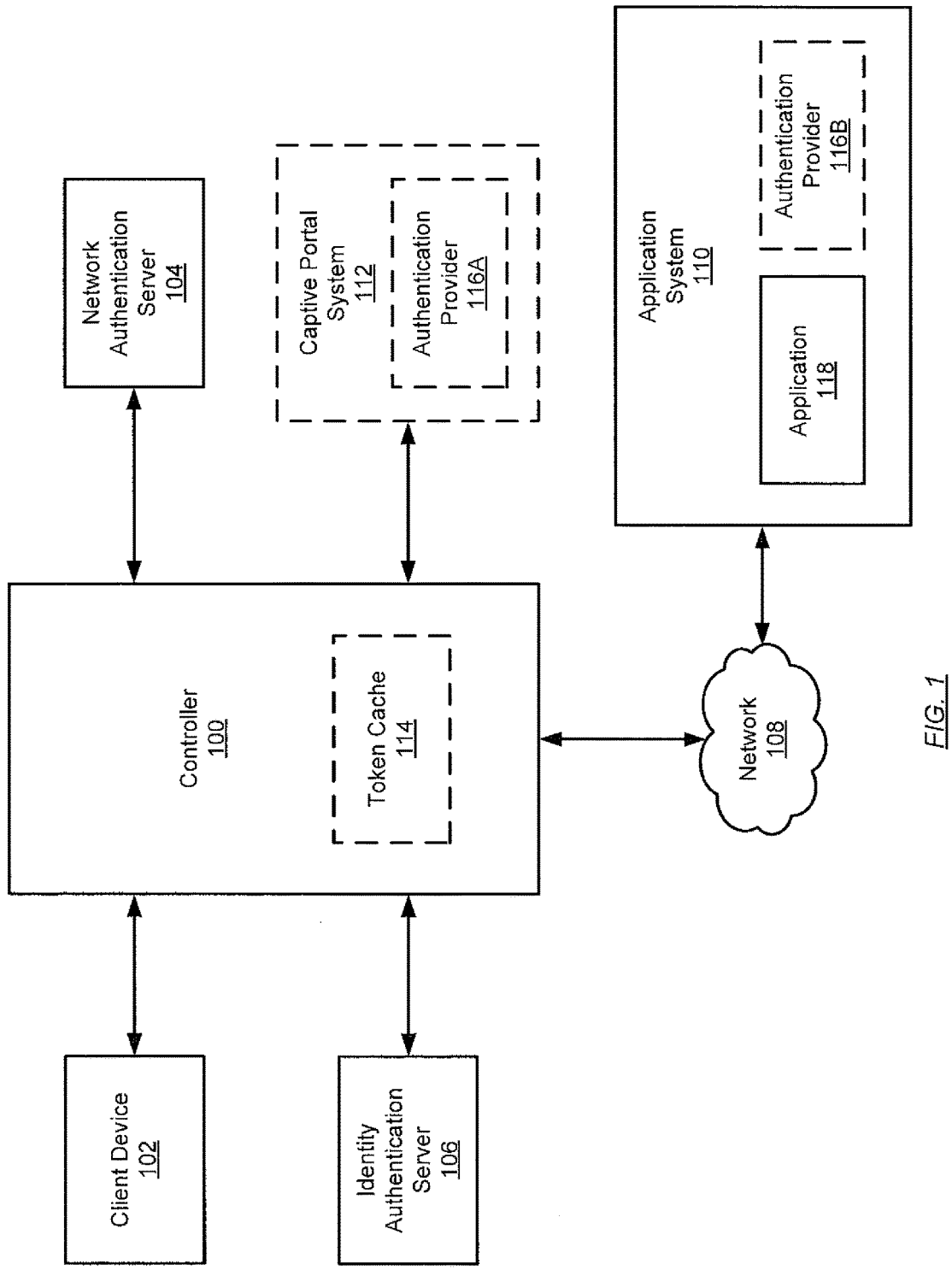
FIG. 1 shows a system in accordance with one or more embodiments.

Specific embodiments will now be described in detail with reference to the accompanying figures. Like elements in the various figures are denoted by like reference numerals for consistency.

In the following detailed description of embodiments, numerous specific details are set forth in order to provide a more thorough understanding. However, it will be apparent to one of ordinary skill in the art that embodiments may be practiced without these specific details. In other instances, well-known features have not been described in detail to avoid unnecessarily complicating the description.

Embodiments of the invention relate to using application level authentication for network login. Specifically, embodiments may grant application level authentication based upon authentication at the network and system level.

One example embodiment may be implemented using a system of one or more network devices. The example system is configured to receive a request to access one or more applications from a client device. The system determines that the client device has already been authenticated to access a network, and based on the determination that the client device has already been authenticated to access the network, the system causes authenticating of the client device for accessing the one or more applications. The example system may cause the authenticating of the client device for access the one or more applications by transmitting, to an authentication server, information indicating that the client device has already been authenticated to access the network. The example system may cause authenticating of the client device for access the one or more applications by transmitting, to the client device, information indicating that the client device has already been authenticated to access the network. The client device then requests authentication from an authentication server using the information received from the example system. The example system may determine that the client device has already been authenticated to access the network by determining that the client device has successfully been authenticated by at least one network device and received access to one or more resources via the at least one network device. The example system may determine that the client device has already been authenticated to access the network by determining that the client device has been authenticated based on credentials provided by the client device to connect to a Service Set Identifier (SSID), used by an access point, that is advertised by the access point as a particular Basic Service Set Identifier (BSSID). The example system may determine that the client device has already been authenticated to access the network by determining that the client device has been authenticated based on credentials provided by the client device to connect to a physical switch port on the network. The client device may be authenticated to access the network by the example system receiving, from the client device, credentials supplied by an operating system or system level application, other than a user application, and authenticating the client device based on the credentials received from the client device.

Embodiments may further be used to grant system or network level authentication based upon authentication at the application level. One example embodiment may be implemented using a system of one or more network devices. An example embodiment may be implemented using a system of one or more network devices. The example system is configured to receive a first client authentication information with an indication that a client device was successfully authenticated by a first authentication server based on credentials provided by the first client device. The example system then forwards the client authentication information to a second authentication server without determining that the client device was already successfully authenticated by the first authentication server based on the credentials provided by the client device. The example system then receives, from the second authentication server, another indication that the client device was successfully authenticated. Based on the second indication received by the system from the second authentication server, the example system grants network access to the client device. The first client authentication information may be transmitted by the first authentication server to the client device and transmitted from the client device to the system. The example system may be a controller or an access point. Prior to receiving the first client authentication information from the client device, the example system may receive, from the client device, a request for the network access and responsive to receiving the request, the example system may trigger a process including (a) the first authentication server obtaining the credentials provided by the client device and (b) the first authentication server authenticating the client device The example system may forward the first client authentication information to the second authentication server without determining the contents of the first client authentication information. The example system may receive a second client authentication information including credentials provided by a second client device, where the second client device has not been authenticated, forward the second client authentication information to the second authentication server without determining whether the second client device has already been authenticated, and receive, from the second authentication server, a third indication that the second client device was successfully authenticated. Based on the third indication, the example system may grant network access to the second client device. The second authentication server may transmit the second indication to the system based on the second authentication server using the first client authentication information to determine that the client device was already successfully authenticated.

Yet another example embodiment may be implemented using an authentication server. Subsequent to a client device being authenticated by the example authentication server, a second authentication server receives, from a system, (a) a request to authenticate the client device for network access and (b) a first client authentication information including a first indication that the first client device has already been authenticated, where the system has forwarded the first client authentication information to the second authentication server without determining that the first client device has already been authenticated. The example authentication server may determine that the client device is authenticated for network access based on the first client authentication information comprising the first indication that the client device has already been authenticated, and by transmitting, to the system, a second indication that the client device is authenticated to access the network, where the system provides network access to the client device based on the second indication received from the second authentication server but not based on the first indication received from the example authentication server. The example authentication server may receive, from the system, (a) a request to authenticate a second client device and (b) a second client authentication information including credentials provided by the second client device, where the system has forwarded the second client authentication information to the second authentication server without determining whether the second client device has already been authenticated.

The example authentication server may then authenticate the second client device based on the credentials provided by the second client device, and transmit, to the system, a third indication that the second client device is authenticated, where the system provides network access to the second client device based on the third indication received from the second authentication server. The example authentication server may determine that the client device is authenticated for network access based on the first client authentication information by the second authentication server decoding the first client authentication information to obtain decoded information and verifying the decoded information to confirm that that the client device is authenticated for network access.

FIG. 1 shows a diagram of a system in accordance with one or more embodiments. As shown in FIG. 1, the system includes a controller (100), a client device (102), a network authentication server (104), and an identity authentication server (106). The controller (100) is connected to an application system (110) via a network (108). The controller (100) is also optionally connected to a captive portal system (112). The captive portal system (112) optionally includes an authentication provider (116A). The application system (110) includes an application (118) and also optionally includes an authentication provider (116B).

In one or more embodiments, the controller (100) is a system of one or more network devices configured to provide and control access to a network or between networks by client devices (such as client device (102)). In one or more embodiments, the controller (100) may control access provided to client devices (such as client device (102)) using a 802.1X scheme and network credentials. The controller (100) may authenticate client devices (such as client device (102) based on credentials provided by the client device to connect to a SSID advertised by the network device as a particular BSSID. The networking devices (such as controller (100)) may authenticate client devices (such as client device (102) based on credentials provided by the client device to connect to a physical switch port on the network. Such credentials may be provided by an operating system or system level application, other than a user application.

In one or more embodiments, the controller (100) includes functionality to intercept requests on the network (108). Specifically, the controller (100) may include functionality to determine whether a request is addressed to a specific location and service the request internally instead of routing the request to the specified location. For example, the controller (100) may include functionality to redirect an access request based on the authentication status of the client device (102) sending the request (for example, redirect the access request to a captive portal). As another example, the controller (100) may include functionality to intercept authentication requests (for example, Security Assertion Markup Language (SAML) requests) targeting an identity authentication server (for example, an SAML idP).

The controller (100) as described herein may be implemented using a variety of other systems of network devices. Such systems include, but are not limited to, the controller (100), an access point, a network router, a network gateway, a layer two networking device (in other words, a network device that operates primarily at the second Open Systems Interconnection (OSI) layer).

In one or more embodiments, the controller (100) optionally includes a token cache (114). In one or more embodiments, the token cache (114) is a combination of hardware and software configured to store a number of tokens mapped to user sessions. The token cache (114) may further be configured to provide a token in response to a request that includes an identifier of a client device (102) or user session.

The token stored in the token cache (114) may be implemented in a variety of ways. In one or more embodiments of the invention, a token is a set of data received from one element and provided to another. A token may include encrypted data communicating information from the providing entity to the receiving entity. Tokens may include, for example, a single sign on (SSO) token provided by an authentication server.

In one or more embodiments, the client device (102) is a user system implemented as a computing device with functionality to interact with the controller (100), application system (110), captive portal system (112), and other elements connected to the network (108). In one or more embodiments, the client device (102) is a computer system used by a user to gain access to one or more elements on the network (108). The client device (102) may include a network interface (not shown) used to send and receive messages to elements on the network (108). Examples of client devices (102) include, but are not limited to, desktop computers, laptop computers, tablet computers, and smartphones.

In one or more embodiments, the network authentication server (104) is a computing system or group of computing system configured to authenticate network credentials. In one or more embodiments, the network authentication server (104) includes a common encryption key shared with the authentication provider (116A). The network authentication server (104) may be a computer system implementing Remote Authentication Dial In User Service (RADIUS) protocol. In one or more embodiments, the controller (100) includes functionality to communicate with the network authentication server (104) as a RADIUS client.

In one or more embodiments, the application system (110) is a computer system or group of computer systems that perform a task in response to requests from client devices (for example, client device (102)). In one or more embodiments, the application system (110) provides resources in response to resource requests. In one or more embodiments, the application system (110) hosts applications (such as web applications (not shown)) on the application system (110). Examples of an application system (110) include, but are not limited to, a web application, a webmail system, a wiki system, and a database system.

In one or more embodiments, the identity authentication server (106) and the authentication providers (authentication provider (116A), authentication provider (116B)) are implementations of authentication servers. The identity authentication server (106) and the authentication providers (authentication provider (116A), authentication provider (116B)) may work in conjunction with one another to validate credentials and/or a token. In one or more embodiments, the identity authentication server (106) is an identity provider (idP) in a Security Assertion Markup Language (SAML) environment. In one or more embodiments, the authentication providers (authentication provider (116A), authentication provider (116B)) are a service provider (SP) in a SAML environment. Other environments, authentication interfaces, and authentication protocols may be implemented, such as OAuth, openID, and Security Support Provider Interface. In one or more embodiments, the authentication providers (authentication provider (116A), authentication provider (116B)) include an encryption key shared with the network authentication server (104).

In one or more embodiments, the captive portal system (112) is a computer system or group of computer systems that host a captive portal (not shown). In one or more embodiments, a captive portal is a target resource (for example, a webpage) to which unrelated requests may be directed based on the authentication status of the source of the unrelated request. A captive portal may include a mechanism for initiating an authentication procedure (for example, using authentication provider (116A)) for a client device that has not yet been authenticated on a system. In one or more embodiments, the captive portal system (112) is integrated into the system of network devices that includes the controller (100).

Figure 2:
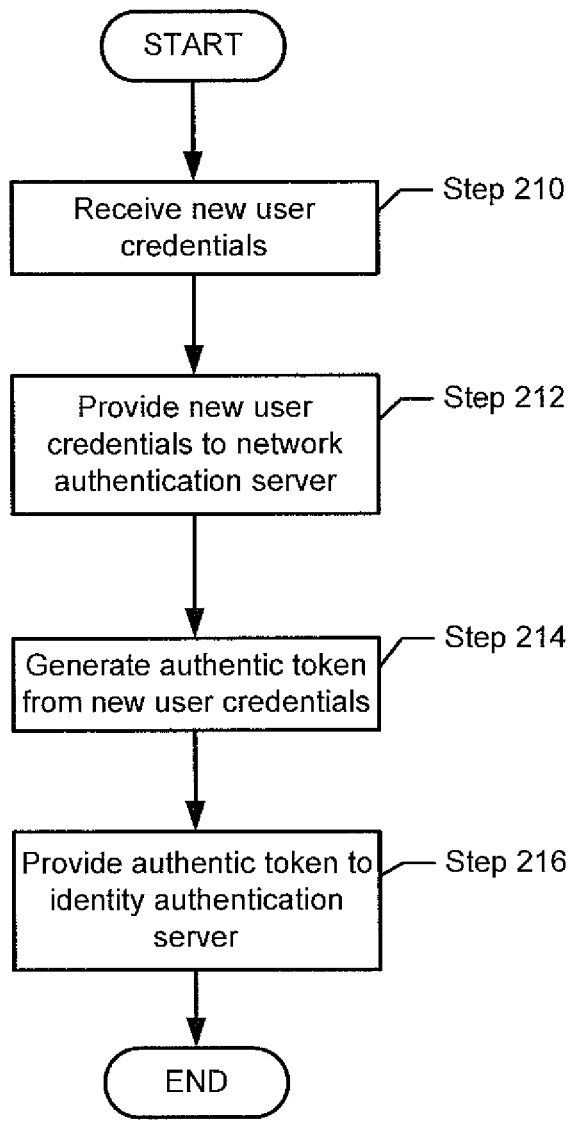
FIG. 2 shows a flow diagram in accordance with one or more embodiments.
Figure 3:
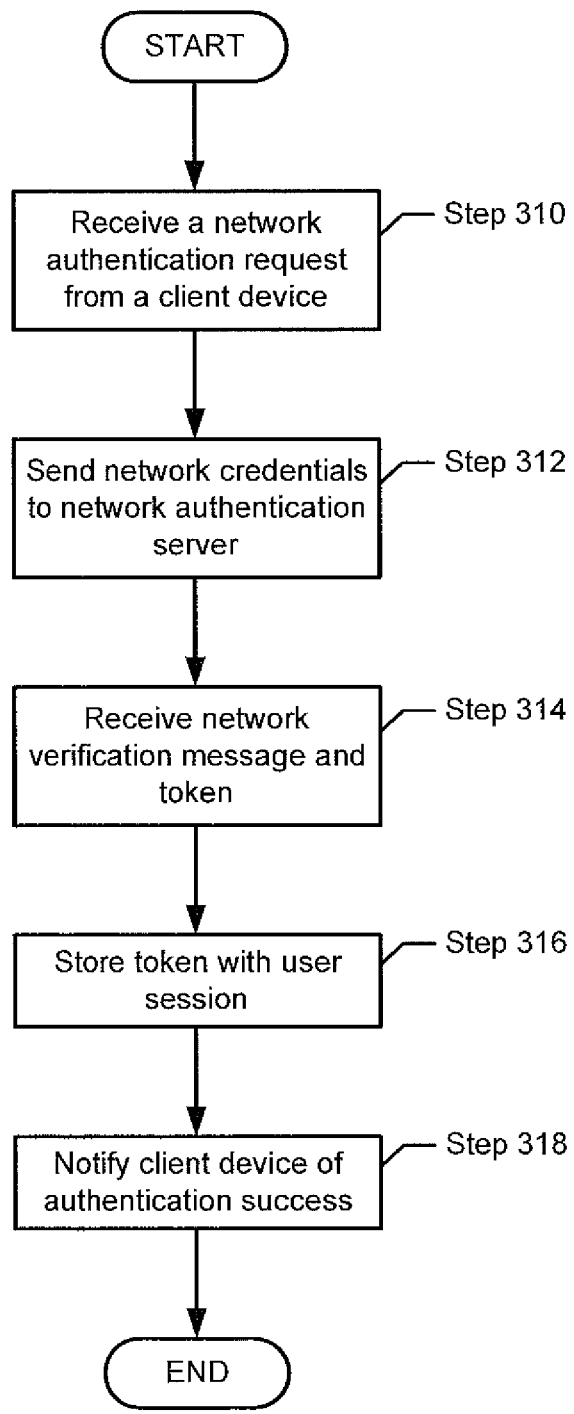
FIG. 3 shows a flow diagram in accordance with one or more embodiments.

FIGS. 2-4 show flow charts for using network credentials to grant access to an application system using an identity authentication server, in accordance with one or more embodiments. FIG. 2 shows a flowchart for adding new credentials to a system in accordance with one or more embodiments. While the various steps in the flowchart are presented and described sequentially, one of ordinary skill will appreciate that some or all of the steps may be executed in different orders, may be combined or omitted, and some or all of the steps may be executed in parallel.

In Step 210, the controller receives new user credentials. In one or more embodiments, the new user credentials are generated when a new user is granted access to a company network (such as a new employee), or when an existing user requests a change to current credentials. The new user credentials may be, for example, a username and password combination or a digital certificate. In one or more embodiments, the new user credentials include an access level to be applied to a client device. An access level may describe the resources that a client device is permitted to access and/or a type of resource that the client device is permitted to access.

In Step 212, the controller provides the new user credentials to the network authentication server. In Step 214, an authentic token is generated from the new user credentials. In one or more embodiments, the authentic token is generated by the network authentication server. Alternatively, in one or more embodiments, the authentic token is generated by the controller and provided to the network authentication server. In one or more embodiments, the token is generated by requesting credentials or the token from the identity authentication server.

In one or more embodiments, the token includes a username and time of authentication, encrypted using a common encryption key. In one or more embodiments, the authentic token includes credentials (for example, a SSO username and SSO password). In one or more embodiments, the credentials may be identical or similar to the network credentials. In one or more embodiments, the token is generated using a common encryption key shared by the network authentication server, the authentication provider, and/or the identity authentication server.

In Step 216, the authentic token and/or credentials for the new user are provided to the identity authentication server as an authentic token/credentials that should be validated by the identity authentication server upon request. In one or more embodiments, Step 216 is omitted if the token is generated by requesting credentials or the token from the identity authentication server.

FIG. 3 shows a flowchart for authenticating a network user in accordance with one or more embodiments. While the various steps in the flowchart are presented and described sequentially, one of ordinary skill will appreciate that some or all of the steps may be executed in different orders, may be combined or omitted, and some or all of the steps may be executed in parallel.

In Step 310, the controller receives a network authentication request from a client device. In one or more embodiments, the network authentication request includes network credentials. In one or more embodiments, the network authentication request is sent by a system or network level process on the client device. In one or more embodiments, the network authentication request is sent by an application level process on the client device. In Step 312, the controller sends the network credentials to the network authentication server. In Step 314, the controller receives a network validation message and a token associated with the network credentials. In one or more embodiments, the validation message is generated based on a determination by the network authentication server that the network credentials match stored authentic network credentials.

In Step 316, the controller stores the token in the token cache. In one or more embodiments, the token is stored in the token cache mapped to a client device session and/or a client device identifier (such as a media access control address). In one or more embodiments, the token may also be stored with a timestamp and/or an expiration time to determine the time at which the token is to be deleted from the token cache.

In Step 318, the controller notifies the client device of the authentication success. In one or more embodiments, the client device is granted access to a network (for example, via the controller) in response to the authentication success.

Figure 4A:
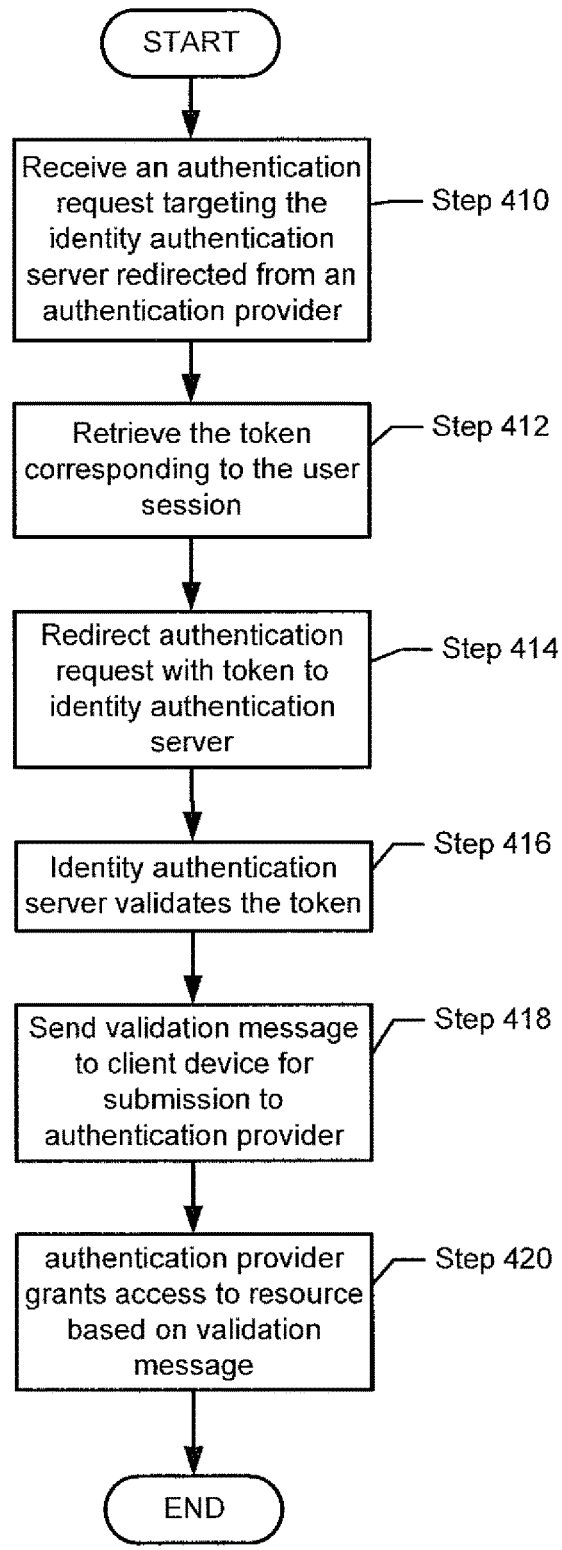
FIGS. 4A and 4B show a flow diagram in accordance with one or more embodiments.

FIG. 4A shows a flowchart for accessing an application system in accordance with one or more embodiments. While the various steps in the flowchart are presented and described sequentially, one of ordinary skill will appreciate that some or all of the steps may be executed in different orders, may be combined or omitted, and some or all of the steps may be executed in parallel.

In Step 410, the controller receives an authentication request targeting the identity authentication server. In one or more embodiments, the controller is configured to intercept authentication requests targeting (in other words, addressed to) the identity authentication server. In one or more embodiments, the authentication request is sent by the authentication provider in response to the client device sending a resource request to access a resource (for example, a web application). The authentication provider for the resource may receive the resource request from the client device and determine that the client device is not associated with a currently active session (in other words, the client device has not been previously validated or the previous validation has expired). In response to determining that the client device is not associated with a currently active session, the authentication provider may then redirect the client device to the identity authentication server with an authentication request to provide credentials for validation. The controller may then intercept this redirected authentication request to provide credentials.

In Step 412, the controller retrieves the token corresponding to the user session. In one or more embodiments, the controller determines whether a token associated with the client device is stored in the token cache, and whether the stored token has expired. Once the controller determines that an unexpired token for the client device exists in the token cache, the token is retrieved.

In Step 414, the controller redirects the authentication request with the token to the identity authentication server as an authentication request. In one or more embodiments, the authentication request is for application level authentication. In Step 416, the identity authentication server validates the token. In one or more embodiments, the token is validated by decrypting the token using a common encryption key to obtain credentials and comparing the credentials to previously received authentic credentials.

In Step 418, the identity authentication server sends a validation message to the client device to be provided to the authentication provider for the resource. In Step 420, the authentication provider receives the validation message and grants the client device access to the resource.

Figure 4B:
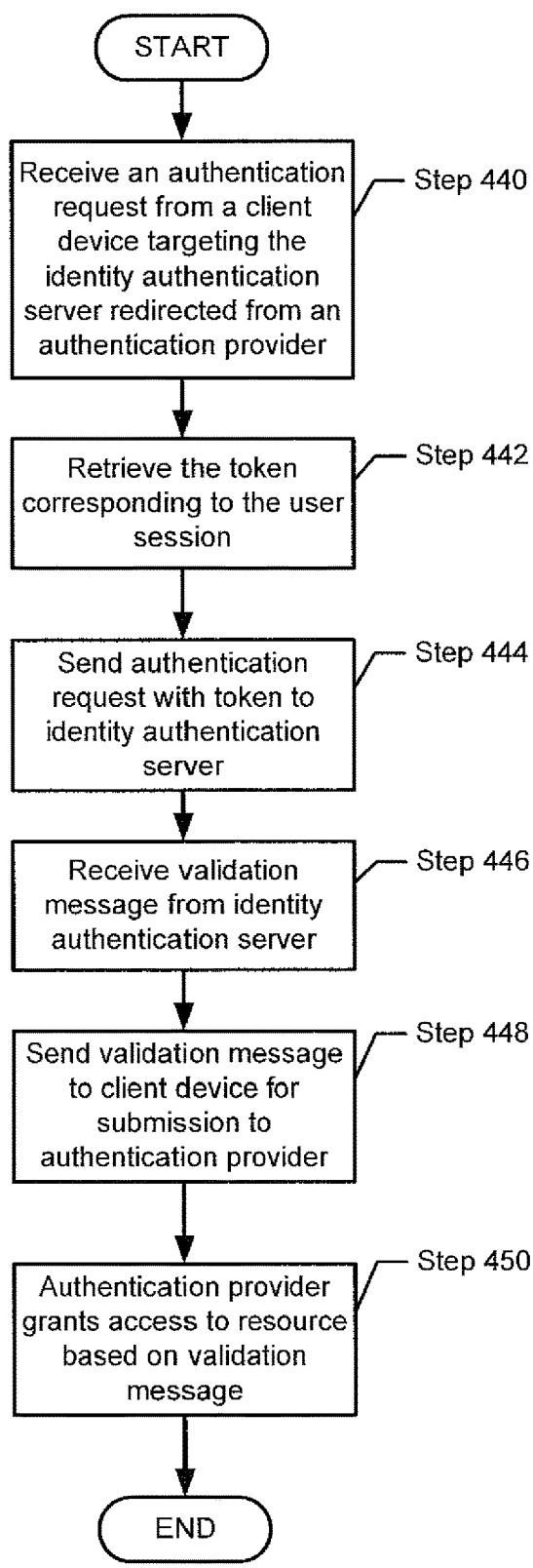

FIG. 4B shows a flowchart for accessing an application system in accordance with one or more embodiments. Specifically, FIG. 4B shows an alternative to the process described in FIG. 4A. While the various steps in the flowchart are presented and described sequentially, one of ordinary skill will appreciate that some or all of the steps may be executed in different orders, may be combined or omitted, and some or all of the steps may be executed in parallel.

In Step 440, the controller receives an authentication request targeting the identity authentication server redirected from an authentication provider. The resource request may be received as described in Step 410 of FIG. 4A. In Step 442, the controller retrieves the token corresponding to the user session. The token may be retrieved as described in Step 412 of FIG. 4A.

In Step 444, the controller sends the authentication request with the token directly to the identity authentication server. In one or more embodiments, the authentication request is modified to include the token, and the modified authentication request is sent to the identity authentication server. In one or more embodiments, the authentication request is for application level authentication. In Step 446, the controller receives a validation message from the identity authentication server to be provided to the authentication provider for the resource. In Step 448, the controller forwards the validation message to the client device to be provided to the authentication provider for the resource. In Step 450, the authentication provider receives the validation message and grants the client device access to the resource.

Figure 5:
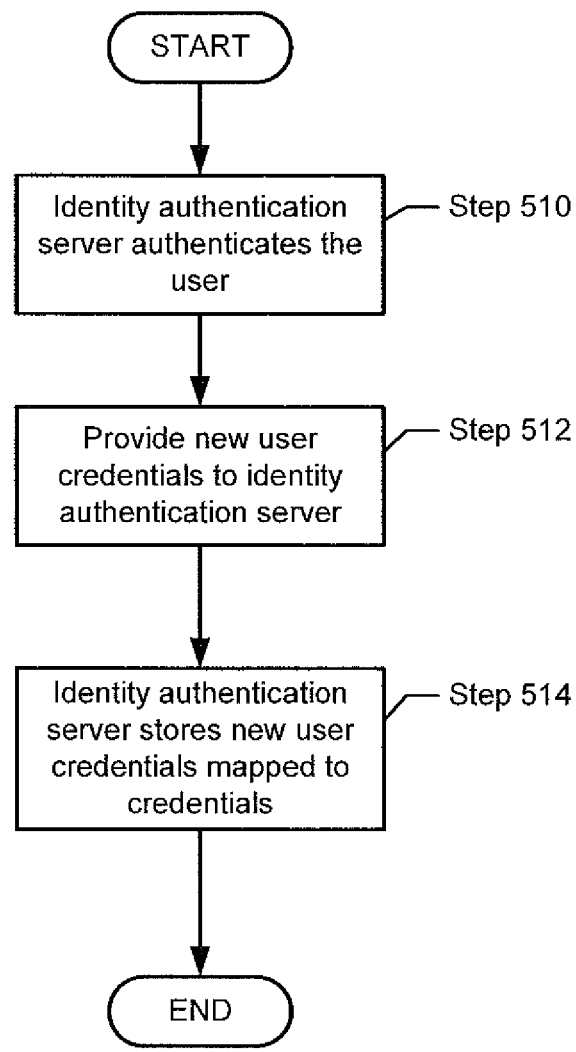
FIG. 5 shows a flow diagram in accordance with one or more embodiments.
Figure 6:
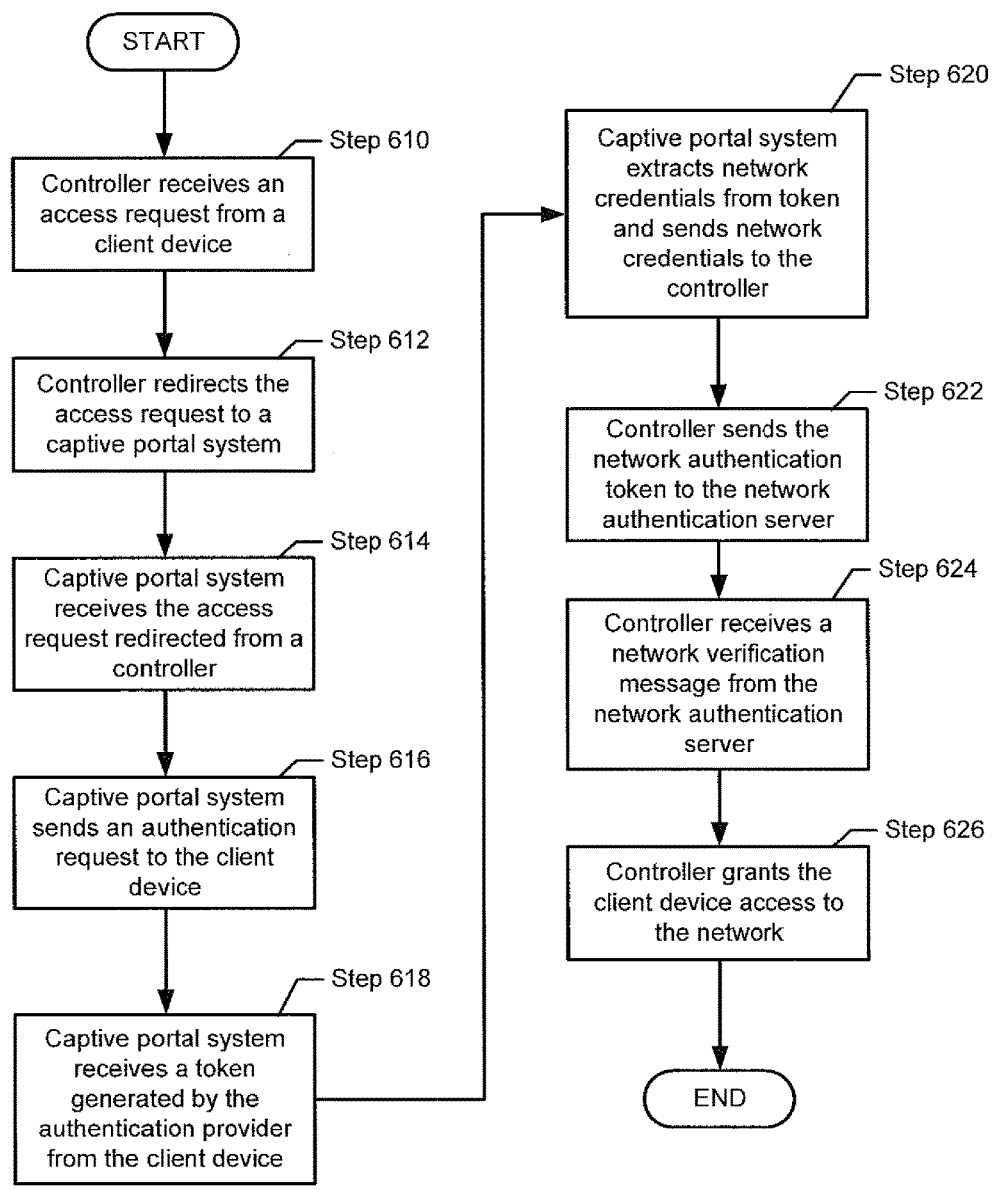
FIG. 6 shows a flow diagram in accordance with one or more embodiments.

FIGS. 5 and 6 show flow charts for using identity authentication server credentials to grant access to a network, in accordance with one or more embodiments. FIG. 5 shows a flowchart for adding new credentials to a system in accordance with one or more embodiments. While the various steps in the flowchart are presented and described sequentially, one of ordinary skill will appreciate that some or all of the steps may be executed in different orders, may be combined or omitted, and some or all of the steps may be executed in parallel.

In Step 510, the identity authentication server authenticates the user. In one or more embodiments, the user is authenticated using a one-time-use code or password. In Step 512, the user provides the new user credentials to the identity authentication server. The new user credentials may be, for example, a username and password combination or a digital certificate. In one or more embodiments, the new user credentials include an access level. In one or more embodiments, the identity authentication server uses the new user credentials to generate authentic credentials used for comparison to credentials later received as part of an authentication request.

In Step 514, the identity authentication server stores the new user credentials mapped to credentials for the same user. In one or more embodiments, the credentials are generated for the new user and provided to the client device.

FIG. 6 shows a flowchart for authenticating a network user in accordance with one or more embodiments. While the various steps in the flowchart are presented and described sequentially, one of ordinary skill will appreciate that some or all of the steps may be executed in different orders, may be combined or omitted, and some or all of the steps may be executed in parallel.

In Step 610, the controller receives an access request from a client device. In one or more embodiments, the access request may be sent by the client device for the purposes of gaining access to resources operatively connected to the controller (for example, via a local network) and/or for the purposes of gaining access to the Internet via the controller.

In Step 612, the controller redirects the access request to the captive portal system. In Step 614, the captive portal system receives the access request redirected from the controller. In Step 616, the captive portal system sends an authentication request to the client device. In one or more embodiments, the authentication request is a prompt requesting credentials presented by an authentication provider on the captive portal system. Also in Step 616, the credentials provided by the client device are sent to the identity authentication server by the authentication provider on the captive portal system.

In Step 618, the captive portal system receives a token generated by the authentication provider. In one or more embodiments, the token is generated in response to receiving a client authentication information including an indication (such as a SSO validation message) that the client device was successfully authenticated from the identity authentication server that has validated the credentials. Once the validation message is received, the authentication provider may retrieve network credentials mapped to the network username and use the network credentials to generate the token. In one or more embodiments, the token includes a username, authentication status, and a password token. In one or more embodiments, the token and/or the password token are generated using the common encryption key.

In Step 620, the captive portal system extracts network credentials from token and sends network credentials to the controller. In one or more embodiments, the network credentials include the username and password token extracted from the token using the common encryption key. In one or more embodiments, the network credentials are sent in an HTTP POST request.

In Step 622, the controller sends the network credentials to the network authentication server. In one or more embodiments, the network authentication server uses the common encryption key to extract (in other words, decode) a password from the password token. Also in Step 622, the network authentication server validates the network credentials using previously received authentic network credentials and generates a network validation message based on a determination that the network credentials are valid. In one or more embodiments, the network validation message includes an access level for the client device. In Step 624, the controller receives a network validation message from the network authentication server. In Step 626, the controller grants the client device access to the network.

Figure 7A:
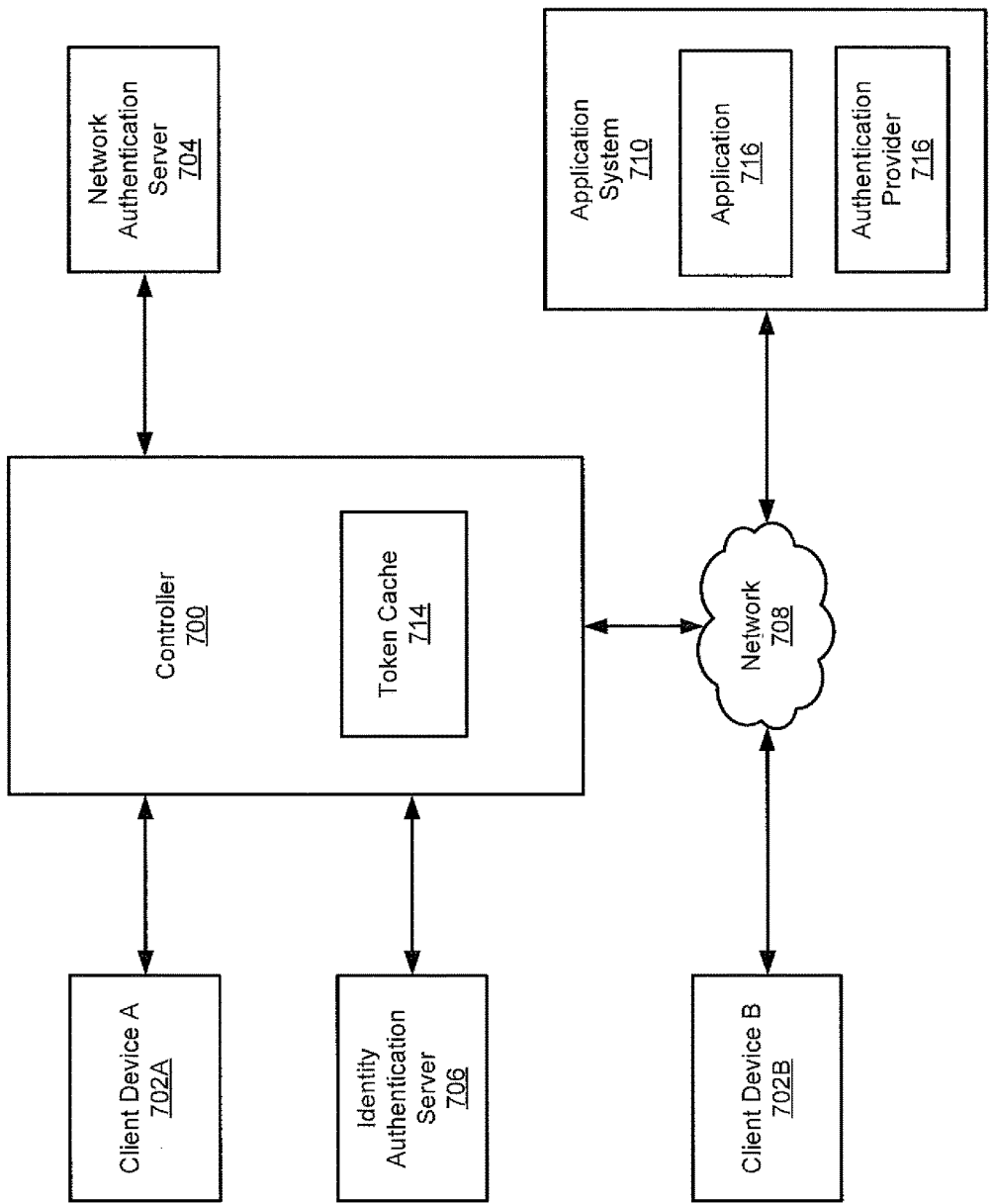
Figure 7B:
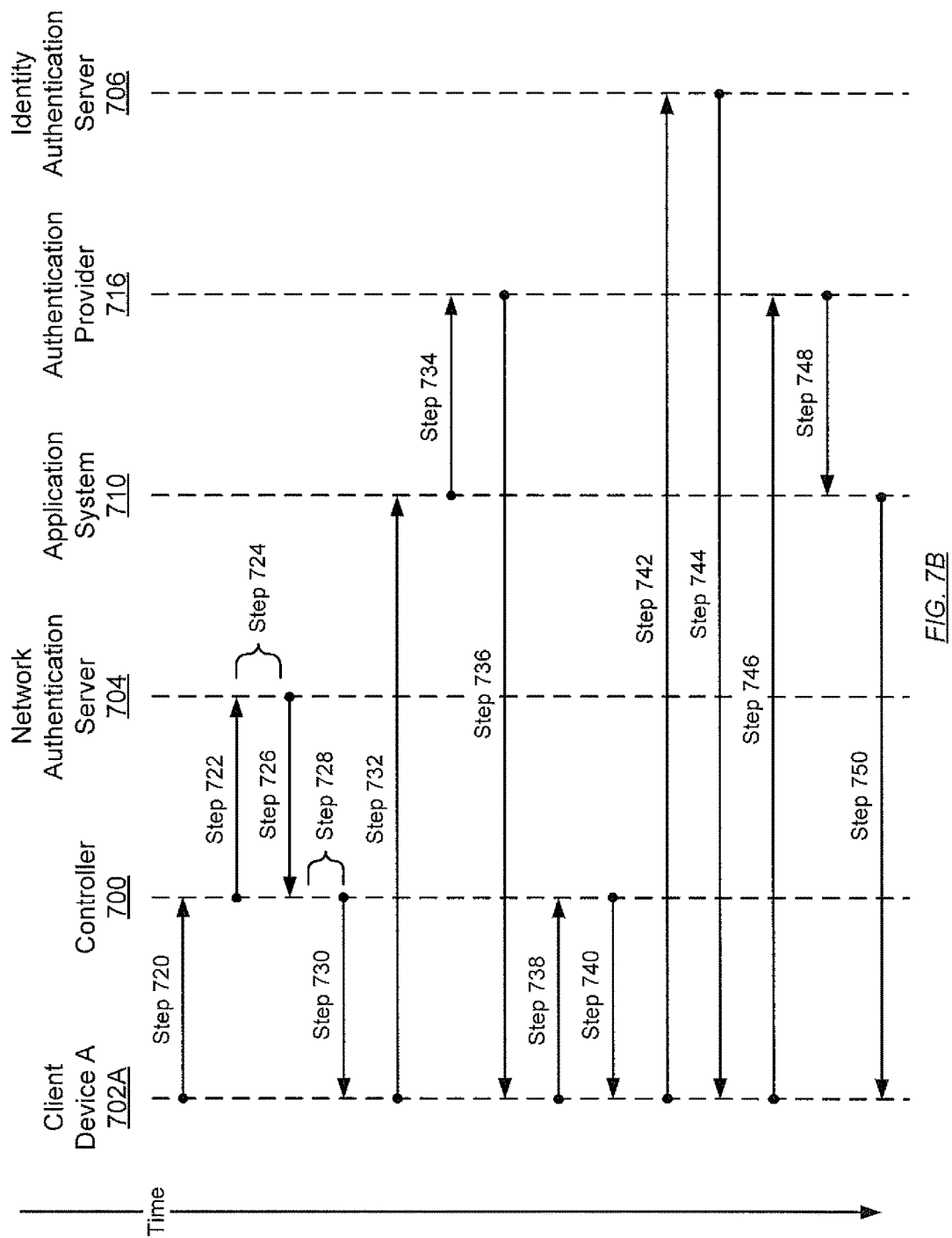

FIGS. 7A-7C show an example for using network credentials to grant access to an application system using identity authentication server validation. Specifically, FIG. 7A-7C show an example of the processes described in FIGS. 2-4. As shown in FIG. 7A, the example system includes a controller (700) communicatively coupled to client device A (702A), a network authentication server (704), and an identity authentication server (706). The controller (700) includes a token cache (714). The controller (700) is also connected to an application system (710) via a network (708). The application system (710) includes an authentication provider (716). Client device B (702B) is also connected to the application system (710) via the network (708).

FIGS. 7B and 7C show example timelines in accordance with one or more embodiments. For the purposes of FIGS.

7B and 7C, assume that the application system (710) is accessible from an internal network access-controlled using the controller (700). Assume also that the application system (710) is also accessible from the Internet.

FIG. 7B shows a timeline for authenticating client device A (702A) for access to the network (708) and to the application system (710). In Step 720, client device A (702A) sends a network authentication request with network credentials including a network username and network password to the controller (700). In Step 722 the controller (700) sends the network credentials to the network authentication server (704).

In Step 724, the network authentication server (704) validates the network username and network password, and retrieves the token mapped to the network username. In Step 726, the network authentication server (704) sends a network validation message and the token associated with the network credentials. In Step 728, the controller (700) stores the token in the token cache (714). In Step 730, the controller (700) notifies the client device of the authentication success.

In Step 732, client device A (702A) sends a resource request to the application system (710) requesting access to a web application. In Step 734, the application system (710) provides the resource request to the authentication provider (716). In Step 736, the authentication provider (716) determines that client device A (702A) is not associated with an active session and redirects the client device to the identity authentication server (706) to provide credentials for validation. In Step 738, the authentication request for client device A (702A) is redirected to the identity authentication server (706), and is intercepted by the controller (700).

In Step 740, the controller (700) retrieves the token corresponding to the user session for client device A (702A) and redirects the authentication request with the token as a modified authentication request to the identity authentication server (706) (using an address that will not be intercepted by the controller (700)). In Step 742, the authentication request modified with the token is redirected to the identity authentication server (706).

In Step 744, the identity authentication server (706) validates the token and sends a validation message to client device A (702A) to be provided to the authentication provider (716) on the application system (710). In Step 746, client device A (702A) provides the validation message to the authentication provider (716). In Step 748, the authentication provider (716) instructs the application system (710) to grant access to client device A (702A). In Step 750, the resource request is serviced by the application system (710).

Step 740 to Step 744 above describe an embodiment as described in FIG. 4A. Alternatively, as described in FIG. 4B, the controller (700) may retrieve the token corresponding to the user session for client device A (702A) and send the authentication request with the token directly to the identity authentication server (706). The controller (700) may then receive a validation message from the identity authentication server (706) to be provided to the authentication provider (716) on the application system (710). The controller (700) may then forward the validation message to client device A (702A) to be provided to the authentication provider (716) on the application system (710).

FIG. 7C shows a timeline for authenticating client device B (702B) for access to the application system (710). For the purposes of FIG. 7C, assume that client device B (702B) is attempting to access the application system (710) from the Internet, and has not been authenticated on the internal network (for example, without using the process described in FIG. 7B).

In Step 760, client device B (702B) sends a resource request to the application system (710) requesting access to a web application. In Step 762, the application system (710) provides the resource request to the authentication provider (716). In Step 764, the authentication provider (716) determines that client device B (702B) is not associated with an active session and redirects client device B (702B) with an authentication request to the identity authentication server (706) to provide credentials for validation.

In Step 766, the authentication request for client device B (702B) is redirected to the identity authentication server (706), and is intercepted by the controller (700). In Step 768, the controller (700) determines that client device B (702B) is not associated with a user session on the internal network and has no token stored in the token cache (714). Also in Step 768, the controller (700) forwards the authentication request, without a token, to the identity authentication server (706).

In Step 770, the identity authentication server (706) requests credentials from client device B (702B). In Step 772, client device B (702B) sends credentials to the identity authentication server (706). In Step 774, the identity authentication server (706) validates the credentials and sends a validation message to client device B (702B) to be provided to the authentication provider (716) on the application system (710). In Step 776, client device B (702B) provides the validation message to the authentication provider (716). In Step 778, the authentication provider (716) instructs the application system (710) to grant access to client device B (702B). In Step 780, the resource request sent from client device B (702B) is serviced by the application system (710).

Figure 8A:
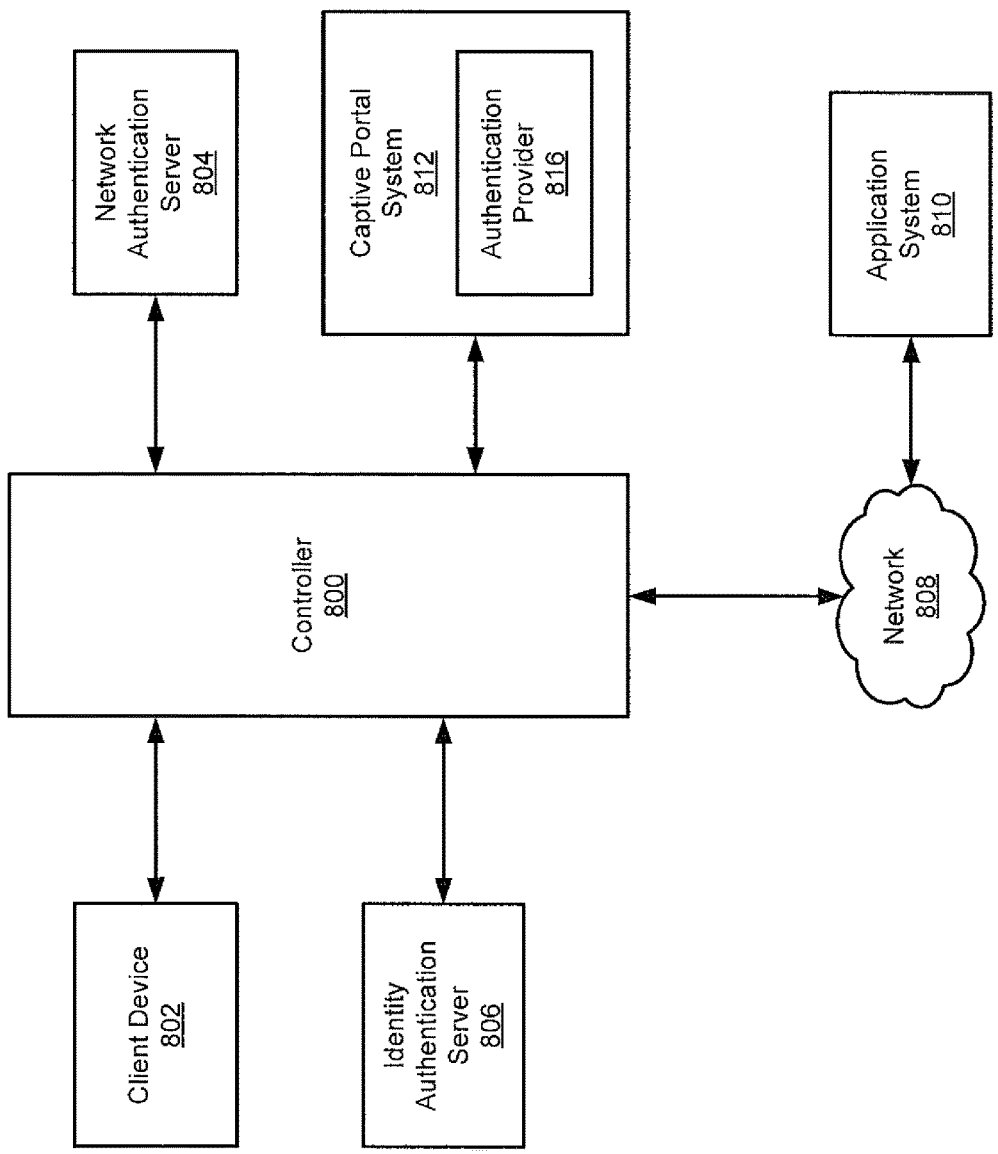
FIGS. 8A and 8B show an example in accordance with one or more embodiments.
Figure 8B:
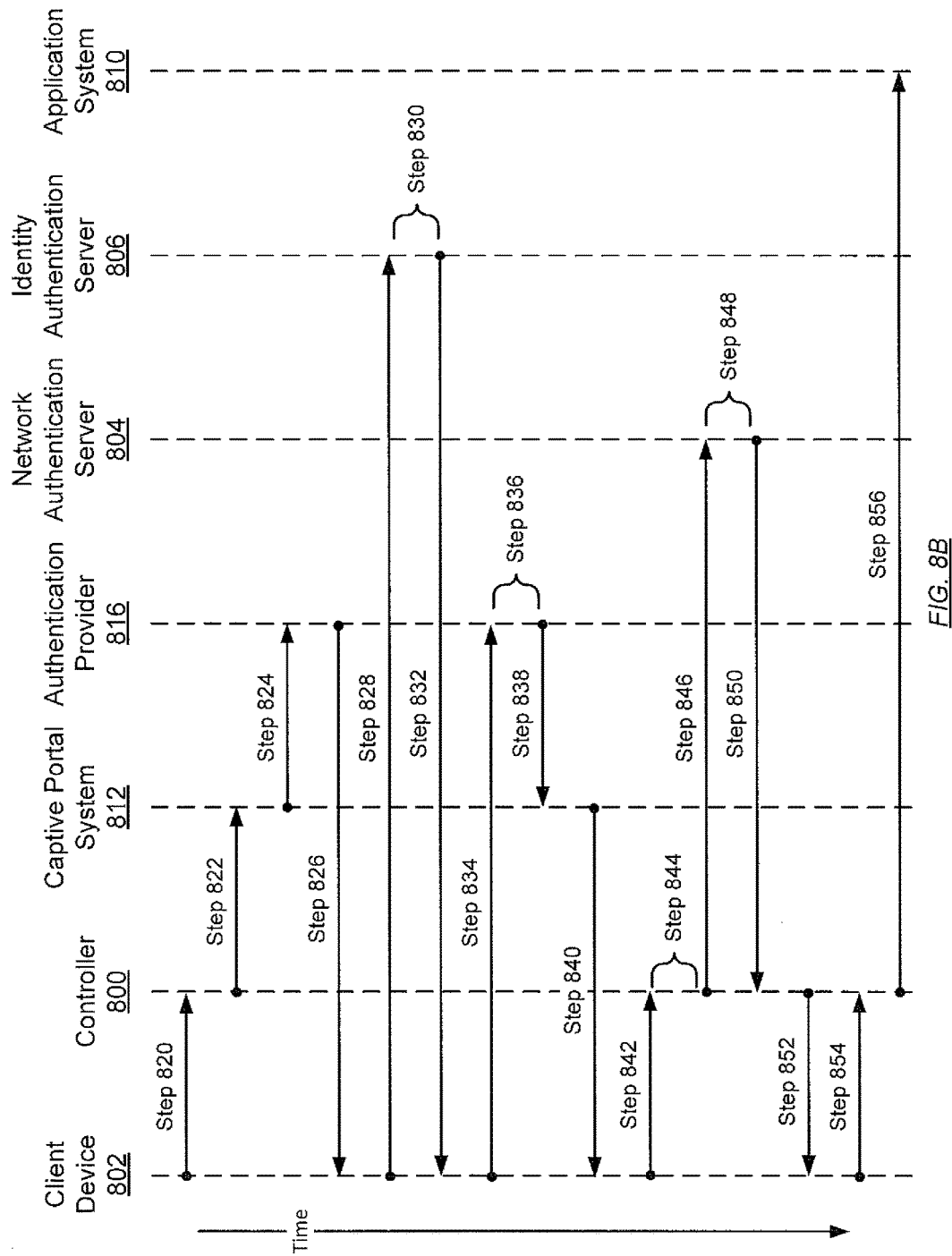

FIGS. 8A and 8B show an example for using credentials to grant access to a network. Specifically, FIGS. 8A and 8B show an example of the processes described in FIGS. 5 and 6. As shown in FIG. 8A, the example system includes a controller (800) communicatively coupled to a client device (802), a network authentication server (804), an identity authentication server (806), and a captive portal system (812). The controller (800) is also connected to an application system (810) via a network (808). The captive portal system (812) includes an authentication provider (814).

FIG. 8B shows an example timeline in accordance with one or more embodiments. In Step 820, the client device (802) requests access to the application system (810) (for example, by typing in www.webapplication.com into a web browser) from the controller (800). In Step 822, the controller (800) determines that the client device (802) has not yet been authenticated on the network and redirects the access request to the captive portal system (812). In Step 824, the captive portal system (812) instructs the authentication provider (816) to authenticate the client device (802) requesting access. In Step 826, the authentication provider determines that the client device (802) is not associated with a currently active session, and instructs the client device (802) to provide credentials to the identity authentication server (806).

In Step 828, the client device (802) provides a username and password to the identity authentication server (806). In Step 830, the identity authentication server (806) authenticates the username and password, and retrieves the user attributes and authentication status mapped to the username. In Step 832, the identity authentication server (806) sends a validation message that includes the user attributes and authentication status to the client device (802), and the client device (802) is redirected to authentication provider (816). In Step 834, the client device (802) provides the validation message including the user attributes and authentication status to the authentication provider (816).

In Step 836, the authentication provider (816) authorizes the user using the validation message, user attributes, and authentication status. Also in Step 836, the authentication provider (816) generates a token that includes the network username for the user, an authentication status of "authenticated", and the network password encrypted using a common encryption key. The token itself is then encrypted using the common encryption key.

In Step 838, the authentication provider (816) sends the token to the captive portal system (812). Also at Step 838, the captive portal system (812) decrypts the token, extracts the network username and the password token from the token, and generates an HTTP POST to the controller (800) that includes the network username and the password token. In Step 840, the HTTP POST is sent to the client device (802). In Step 842, the client device (802) provides the network username and the password token to the controller (800).

In Step 844, the controller (800) generates a RADIUS request using the network username and the password token. In Step 846, the controller (800) sends the RADIUS request to the network authentication server (804). In Step 848, the network authentication server (804) decrypts the password token and extracts the network password from the password token. Also in Step 848, the network authentication server authenticates the network username and the network password and determines that the network username and network password are valid.

In Step 850, the network authentication server (804) sends a validation message to the controller (800) indicating that the client device (802) is authenticated for access to the network. In Step 852, the controller (800) informs the client device (802) that the authentication succeeded. In Step 854, the client device (802) requests access to the application system (810) (for example, by typing in www.webapplication.com into a web browser) from the controller (800). In Step 856, the controller (800) determines that the client device (802) has been authenticated on the network forwards the request to the application system (810).

Figure 9:
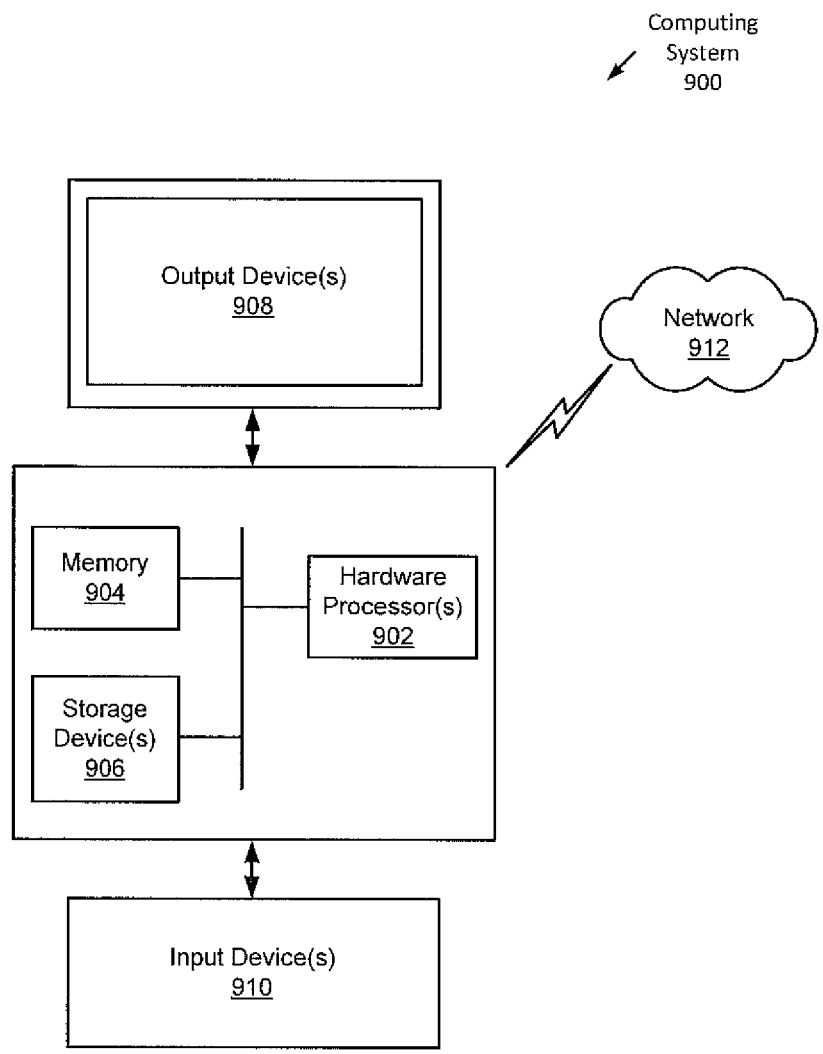
FIG. 9 shows a computer system in accordance with one or more embodiments.

Embodiments may be implemented on virtually any type of computing system regardless of the platform being used. For example, the computing system may be one or more mobile devices (for example, laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments. For example, as shown in FIG. 9, the computing system (900) may include one or more hardware processor(s) (902), associated memory (904) (for example, random access memory (RAM), cache memory, flash memory, etc.), one or more storage device(s) (906) (for example, a hard disk, an optical drive such as a compact disk (CD) drive or digital versatile disk (DVD) drive, a flash memory stick, etc.), and numerous other elements and functionalities. The hardware processor(s) (902) may be an integrated circuit for processing instructions. For example, the hardware processor(s) may be one or more cores, or micro-cores of a processor. The computing system (900) may also include one or more input device(s) (910), such as a touchscreen, keyboard, mouse, microphone, touchpad, electronic pen, or any other type of input device. Further, the computing system (900) may include one or more output device(s) (908), such as a screen (for example, a liquid crystal display (LCD), a plasma display, touchscreen, cathode ray tube (CRT) monitor, projector, or any other display device), a printer, external storage, or any other output device. One or more of the output device(s) may be the same or different from the input device(s). The computing system (900) may be connected to a network (912) (for example, a local area network (LAN), a wide area network (WAN) such as the Internet, mobile network, or any other type of network) via a network interface connection (not shown). The input and output device(s) may be locally or remotely (for example, via the network (912)) connected to the hardware processor(s) (902), memory (904), and storage device(s) (906). Many different types of computing systems exist, and the aforementioned input and output device(s) may take other forms.

Software instructions in the form of computer readable program code to perform embodiments may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments.

Further, one or more elements of the aforementioned computing system (900) may be located at a remote location and connected to the other elements over a network (912). Further, embodiments may be implemented on a distributed system having a plurality of nodes, where each portion of the embodiments may be located on a different node within the distributed system. In one or more embodiments, the node corresponds to a distinct computing device. Alternatively, the node may correspond to a hardware processor with associated physical memory. The node may alternatively correspond to a hardware processor or micro-core of a hardware processor with shared memory and/or resources.

While embodiments have been described with respect to a limited number of embodiments, those skilled in the art, having benefit of this disclosure, will appreciate that other embodiments can be devised which do not depart from the scope as disclosed herein. Accordingly, the scope should be limited only by the attached claims.

What is claimed is:

1. A non-transitory computer readable medium comprising instructions which, when executed by one or more hardware processors of a controller, cause the one or more hardware processors of the controller to:
intercept an authentication request addressed to an identity authentication server that would have received the authentication request in an absence of the interception in response to a network authentication provider determining that a first client device is not associated with a currently active session;
retrieve a token associated with the first client device that is stored in a cache at the controller in response to the interception, wherein the token is generated in response to receiving a first client authentication information including an indication that the first client device was successfully authenticated by a network authentication server based on credentials provided by the first client device;
redirect the intercepted authentication request with the token to the identity authentication server using an address that will not be intercepted by the controller;

receive, from the identity authentication server, an indication that the first client device was successfully authenticated; and based on the indication received from the identity authentication server, grant network access to the first client device.

2. The non-transitory computer readable medium of claim 1, wherein the first client authentication information indicating that the first client device was successfully authenticated is transmitted from the network authentication server to the first client device and transmitted from the first client device to a resource provider.

3. The non-transitory computer readable medium of claim 1, wherein the one or more hardware processors are to forward the first client authentication information and the token to the identity authentication server without determining that the client device was already successfully authenticated by the network authentication server.

4. The non-transitory computer readable medium of claim 1, wherein prior to intercepting the authentication request from a resource provider, the one or more hardware processors of the controller are to:

receive, from the first client device, a request for the network access;

responsive to receiving the request for the network access, trigger a process comprising the network authentication server obtaining the credentials provided by the first client device and the network authentication server authenticating the first client device.

5. The non-transitory computer readable medium of claim 1, wherein the one or more hardware processors of the controller are to forward the first client authentication information and the token to the identity authentication server without determining contents of the first client authentication information.

6. The non-transitory computer readable medium of claim 1, wherein the instructions further cause the one or more hardware processors of the controller to:

store, in the cache at the controller, a token associated with a second client device;

receive second client authentication information comprising credentials provided by the second client device, wherein the second client device has not been authenticated;

retrieve the token associated with the second client device and forward the second client authentication information and the token associated with the second client device to the identity authentication server without determining whether the second client device has already been authenticated;

receive, from the identity authentication server, a third indication that the second client device was successfully authenticated;

based on the third indication indicating that the second client device was successfully authenticated, grant network access to the second client device.

7. The non-transitory computer readable medium of claim 1, wherein the identity authentication server transmits the indication to the controller based on the identity authentication server using the first client authentication information to determine that the first client device was already successfully authenticated.

8. A non-transitory computer readable medium comprising instructions which, when executed by one or more hardware processors, cause performance of operations comprising:

subsequent to a first client device being authenticated by a network authentication server:

receiving, by an identity authentication server from a controller, an authentication request to authenticate the first client device for network access, a first client authentication information comprising a first indication that the first client device has already been authenticated, and a token associated with the first client device, wherein:

the authentication request addressed to the identity authentication server is intercepted by the controller upon determining, by a resource provider, that the first client device is not associated with a currently active session;

the identity authentication server would have received the authentication request in an absence of the interception; and the authentication request to authenticate the first client device for network access, the first client authentication information, and the token are redirected to the identity authentication server by the controller using an address that will not be intercepted by the controller;

determining, by the identity authentication server, that the first client device is authenticated for network access based on the token and the first client authentication information comprising the first indication that the first client device has already been authenticated; and transmitting, by the identity authentication server to the controller, a second indication that the first client device is authenticated for network access, wherein the controller provides network access to the first client device based on the second indication received from the identity authentication server.

9. The non-transitory computer readable medium of claim 8, wherein the operations further comprise:

receiving, by the identity authentication server from the controller, a request to authenticate a second client device, a second client authentication information comprising credentials provided by the second client device, and a token associated with the second client device stored in a token cache at the controller;

authenticating, by the identity authentication server, the second client device based on the token associated with the second client device and the credentials provided by the second client device;

transmitting, by the identity authentication server to the controller, a third indication that the second client device is authenticated, wherein the controller provides network access to the second client device based on the third indication received from the identity authentication server.

10. The non-transitory computer readable medium of claim 8, wherein the determining, by the identity authentication server, that the first client device is authenticated for network access based on the token and the first client authentication information comprises:

decoding, by the identity authentication server, the first client authentication information to obtain decoded information;

verifying the decoded information to confirm that that the first client device is authenticated for network access.

11. A network device comprising:

a hardware processor; and a memory storing instructions that when executed by the hardware processor cause the hardware processor to:

intercept an authentication request addressed to an identity authentication server that would have received the authentication request in an absence of the interception in response to determining a first token associated with a first client device has not been validated or is expired;

retrieve a second token associated with the first client device that is stored in a cache at the network device in response to the interception, wherein the second token is generated in response to receiving a first client authentication information including an indication that the first client device was successfully authenticated by a network authentication server based on credentials provided by the first client device;

redirect the intercepted authentication request with the second token to the identity authentication server using an address that will not be intercepted by the network device;

receive, from the identity authentication server, a second indication that the first client device was successfully authenticated; and based on the second indication received by the network device from the identity authentication server, grant network access to the first client device.

12. The network device of claim 11, wherein the first client authentication information indicating that the first client device was successfully authenticated is transmitted from the network authentication server to the first client device and transmitted from the first client device to the network device.

13. The network device of claim 11, wherein the network device is one of a controller or an access point.

14. The network device, of claim 11, wherein prior to receiving the first client authentication information from the first client device, the instructions are to cause the hardware processor to:

receive, from the first client device, a request for the network access;

responsive to receiving the request for the network access, trigger a process comprising the network authentication server obtaining the credentials provided by the first client device and the network authentication server authenticating the first client device.

15. The network device of claim 11, wherein the hardware processor is to forward the first client authentication information and the token to the identity authentication server without determining contents of the first client authentication information.

16. The network device of claim 11, wherein the instructions are further to cause the hardware processor to:

store, in the cache at the network device, a token associated with a second client device;

receive a second client authentication information comprising credentials provided by the second client device, wherein the second client device has not been authenticated;

retrieve the token associated with the second client device and forward the second client authentication information and the token associated with the second client device to the identity authentication server without determining whether the second client device has already been authenticated;

receive, from the identity authentication server, a third indication that the second client device was successfully authenticated;

based on the third indication indicating that the second client device was successfully, authenticated, grant network access to the second client device.

17. The network device of claim 11, wherein the identity authentication server transmits the second indication to the network device based on the identity authentication server using the first client authentication information to determine that the first client device was already successfully authenticated.

18. An identity authentication server comprising:
a hardware processor; and
a memory storing instructions that when executed by the hardware processor cause the hardware processor to:
subsequent to a first client device being authenticated by a network authentication server:
receive, from a controller, an authentication request to authenticate the first client device for network access, a first client authentication information comprising a first indication that the first client device has already been authenticated, and a token associated with the first client device, wherein:
the authentication request addressed to the identity authentication is intercepted by the controller upon determining, by a resource provider, that the first client device is not associated with a currently active session,
the identity authentication server would have received the authentication request in an absence of the interception; and
the authentication request to authenticate the first client device for network access, the first client authentication information, and the token are redirected to the identity authentication server by the controller using an address that will not be intercepted by the controller;
determine that the first client device is authenticated for network access based on the token and the first client authentication information comprising the first indication that the first client device has already been authenticated, and
transmit, to the controller, a second indication that the first client device is authenticated for network access, wherein the controller provides network access to the first client device based on the second indication received from the identity authentication server.

19. The identity authentication server of claim 18, wherein the instructions are further to cause the hardware processor to:
receive, from the controller, a request to authenticate a second client device, a second client authentication information comprising credentials provided by the second client device, and a token associated with the second client device stored in a token cache at the controller, authenticate the second client device based on the credentials provided by the second client device, and
transmit, to the controller, a third indication that the second client device is authenticated, wherein the controller provides network access to the second client device based on the third indication received from the identity authentication server.

20. The identity authentication server of claim 18, wherein to determine that the first client device is authenticated for network access based on the first client authentication information, the instructions are to cause the hardware processor to:

decode the first client authentication information to obtain decoded information, and verify the decoded information to confirm that the first client device is authenticated for network access.

* * * * *